US012800029B2

(12) United States Patent
Morrissey et al.

(10) Patent No.: US 12,800,029 B2
(45) Date of Patent: Nov. 17, 2026

(54) SEAL ARRANGEMENT

(71) Applicant: John Crane UK Limited, Slough (GB)

(72) Inventors: Martin Morrissey, Slough (GB); Robert Letizia, Slough (GB); Matthew Davies, Slough (GB)

(73) Assignee: John Crane UK Limited, Slough (GB)

(*) Notice: Subject to any disclaimer, the term of this patent is extended or adjusted under 35 U.S.C. 154(b) by 0 days.

(21) Appl. No.: 18/881,816

(22) PCT Filed: Jul. 10, 2023

(86) PCT No.: PCT/GB2023/051815
§ 371 (c)(1),
(2) Date: Jan. 7, 2025

(87) PCT Pub. No.: WO2024/009115
PCT Pub. Date: Jan. 11, 2024

(65) Prior Publication Data

US 2025/0257800 A1 Aug. 14, 2025

(30) Foreign Application Priority Data

Jul. 8, 2022 (GB) ...................................... 2210090

(51) Int. Cl.
*F16J 15/34* (2006.01)
*F04B 39/04* (2006.01)

(52) U.S. Cl.
CPC ......... *F16J 15/3464* (2013.01); *F04B 39/041* (2013.01)

(58) Field of Classification Search
CPC ...... F16J 15/3464; F16J 15/3484; F16J 15/38; F16J 15/3476; F16J 15/3452; F16J 15/346; F04B 39/041; F01C 19/00; F04C 27/00

(Continued)

(56) References Cited

U.S. PATENT DOCUMENTS 4,212,475 A * 7/1980 Sedy .................... F16J 15/3412 277/400
4,586,719 A 5/1986 Marsi
(Continued)

FOREIGN PATENT DOCUMENTS

EP 1656516 B1 5/2008
EP 3312389 A1 4/2018
(Continued)

OTHER PUBLICATIONS

International Search Report and Written Opinion, International Patent Application No. PCT/GB2023/051815, Oct. 12, 2023.
(Continued)

*Primary Examiner* — Mark A Laurenzi
*Assistant Examiner* — Benjamin Doyle
(74) *Attorney, Agent, or Firm* — Saul Ewing LLP; Brian R. Landry; Ian Mahany-Horton

(57) ABSTRACT

The present invention relates to seal arrangements for rotating components, in particular, for rotating components which are driven at variable angular speeds. An aspect of the disclosure provides a seal arrangement for an apparatus comprising: a housing; and, a rotatable component disposed within the housing; wherein the rotatable component is configured to rotate at a variable angular speed about a rotational axis, the seal arrangement comprising: a first seal assembly configured to be disposed on the rotatable component of the apparatus and to rotate around the rotational axis, the first seal assembly comprising: a first retainer; a first seal face; wherein: the first seal face is disposed within the first retainer; and, the first retainer is configured to provide a rotary driving force to the first seal face to thereby rotationally drive the first seal face; a first cushioning member disposed between the first seal face and the first retainer, wherein the first cushioning member is configured to dampen the rotary driving force provided by the first retainer to the first seal face; a second seal assembly configured to be disposed on the housing: a second retainer; a second seal face; wherein: the second seal face configured to be disposed within the second retainer; wherein the first seal (Continued)

face is disposed in contact with the second seal face to thereby seal against egress of fluid between the first seal face and the second seal face.

10 Claims, 9 Drawing Sheets

(58) Field of Classification Search
USPC .......................................................... 417/437
See application file for complete search history.

(56) References Cited

U.S. PATENT DOCUMENTS

| | | | | |
|---|---|---|---|---|
| 5,375,853 | A * | 12/1994 | Wasser | F16J 15/3404 277/408 |
| 7,240,904 | B2 * | 7/2007 | Droscher | F16J 15/3464 277/584 |
| 10,670,149 | B2 * | 6/2020 | Kirchner | F16J 15/3464 |
| 11,280,335 | B2 | 3/2022 | Krampe | |
| 2005/0035554 | A1 | 2/2005 | Roberts | |
| 2008/0093806 | A1 * | 4/2008 | Takahashi | F16J 15/348 277/375 |

FOREIGN PATENT DOCUMENTS

| | | | |
|---|---|---|---|
| WO | 94/05936 | A1 | 3/1994 |
| WO | 2010/132010 | A1 | 11/2010 |
| WO | 2014/112885 | A2 | 7/2014 |

OTHER PUBLICATIONS

Combined Search and Examination Report under Sections 17 and 18(3), GB Patent Application No. GB2210090.3, Jan. 9, 2023.

* cited by examiner

SEAL ARRANGEMENT

CROSS-REFERENCE TO RELATED APPLICATIONS

This application is a national phase application under 35 U.S.C 371 of International Application No. PCT/GB2023/051815, filed Jul. 10, 2023, which claims priority to United Kingdom Patent Application No. 2210090.3, filed Jul. 8, 2022. The entire contents of each application is hereby incorporated by reference herein.

FIELD OF INVENTION

The present invention relates to seal arrangements for rotating components, in particular, for rotating components which are driven at variable angular speeds.

BACKGROUND

Typical mechanical seals may be used in rotating equipment such as, for example, compressors and pumps. Rotating equipment typically comprises a driving side (e.g. shaft side) and a driven side (e.g. bearing side).

Mechanical seals for rotating equipment comprise a seal arrangement and a flow of fluid through the seal arrangement.

Seal arrangements comprise a mating ring and a primary ring. In their simplest forms, both the mating ring and the primary ring can be considered annular circular cylinders (although it should be noted that in most realisations the cross sections are in fact non-rectangular). It will be appreciated that an annular circular cylinder comprises: an inner radial surface; an outer radial surface; two axial faces (e.g. faces which are bordered by an edge of the inner radial surface and an edge of the outer radial surface). In such rings, the inner radial surface bounds a central hole through the cylinder, and a central longitudinal axis (e.g. a straight line, perpendicular to radial and circumferential directions of the annular circular cylinder) passes through this central hole.

In a typical seal arrangement, the mating ring is positioned so that an axial face of the mating ring opposes an axial face of the primary ring. The mating ring is disposed on the driving side of the rotating equipment and is positioned so that an axis of rotation of the rotating equipment is coincident with the central longitudinal axis of the mating ring. The mating ring is rotatable about the axis of rotation of the rotating equipment e.g. by the shaft which drives the rotating equipment. The primary ring is stationary, and presented to the driven side of the rotating equipment. An axis of rotation of the rotating equipment is coincident with the central longitudinal axis of the primary ring. An urging means is provided to urge, in an axial direction, the primary ring toward the mating ring to thereby prevent or reduce fluid flow therebetween.

In examples, the primary ring may be rotatable about the axis of rotation (e.g. the primary ring is disposed on the driving side of the rotating equipment) and the mating ring may be stationary (e.g. disposed on a driven side of the rotating equipment). In such examples, an urging means is provided to urge, in an axial direction, the primary ring toward the mating ring to thereby prevent or reduce fluid flow therebetween.

A fluid flow, such as a dry gas flow, provides a thin film of fluid between the opposing faces of the primary ring and the mating ring. The thin film, sometimes referred to as a fluid film, generates hydrostatic forces (e.g. forces which are present regardless of whether the mating ring is stationary or rotating) and hydrodynamic forces (e.g. forces which are present only when the mating ring rotates) which are exerted on the mating ring and primary ring. Grooves may be provided on the mating ring (e.g. logarithmic spiral grooves) which are involved in generating the hydrodynamic forces, for example, when the mating ring rotates, the grooves may shear fluid flow towards the central longitudinal axis of the mating ring which increases the pressure of the fluid flow.

In examples, the fluid may comprise, a process gas and/or a buffer gas.

In examples, the mechanical seal may be a wet seal wherein the fluid flow comprises oil or another liquid.

The hydrostatic and hydrodynamic forces urge the mating ring and primary ring apart (e.g. the primary ring is forced away from the mating ring in an axial direction, against the force of the urging means). The thin fluid film also prevents wear of the mating ring and primary ring. The mating ring, the primary ring and the fluid flow between the opposing axial faces of the rings cooperate to provide a mechanical seal. The mechanical seal, seals the driving side (e.g. a bearing side) of the rotating equipment from the driven side (e.g. a gas side) of the rotating equipment.

Seal arrangements comprise a drive mechanism configured to transfer torque from a component of a driving side of the rotating equipment to a seal ring (i.e., wherein the seal ring is either a mating ring or a primary ring). Typically the component of the driving side is formed of metal (e.g.: steel; nickel-molybdenum-chromium alloy or other metal alloy) and the seal ring is formed of a brittle material (e.g. silicon carbide or tungsten carbide or silicon nitride).

FIG. 1A illustrates an axial cross-sectional view of a first prior art drive mechanism. FIG. 1B illustrates a lateral plan view of the first prior art drive mechanism illustrated in FIG. 1A. FIG. 1C illustrates a perspective view of the first prior art drive mechanism illustrated in FIGS. 1A and 1B. The first prior art drive mechanism may be referred to as a lug drive mechanism.

The first prior art drive mechanism 100 comprises: a seal ring 110 (e.g. a primary ring or a mating ring); and, a retainer 120.

The seal ring 110 comprises: a seal ring annular portion 112; and, an ear 114 (also referred to as a lug). The ear 114 is a radial projection disposed on a seal ring radial outer surface of the annular portion 112.

The retainer 120 comprises: a retainer annular portion 122; and, a slot 124. The slot 124 is disposed in the retainer annular portion 122 thereby to provide a radial cavity in the retainer annular portion 122.

The seal ring annular portion 112 has an outer radius (e.g. the radius of the outer radial surface of the seal ring annular portion) which is less than the inner radius of the retainer annular portion 122 (e.g. the radius of an inner radial surface of the retainer annular portion 122). In other words, the retainer annular portion 122 is sized to receive and surround the seal ring annular portion 112. The ear 114 of the seal ring 110 is sized to fit within the slot 124 of the retainer 120.

When assembled for use, the seal ring annular portion 112 is disposed within the retainer annular portion 122 and the ear 114 is disposed within the slot 124. The ear 114 and the slot 124 provide a drive mechanism.

In use, the rotating apparatus provides a torque which rotates the retainer 120. As the retainer 120 rotates in response to the torque applied by the rotating apparatus, a torque is transferred from the retainer 120 to the seal ring 110. In more detail, the torque is transferred from the retainer 120 to the seal ring 110 via the driving mechanism provided by the slot 124 and the ear 114. Put another way, as the retainer 120 rotates, sides of the slot 124 act on the ear 114 disposed therein, thereby forcing the seal ring 110 to rotate with the retainer 120.

In examples, such as that shown in FIG. 1B, the ear 114 comprises a flared portion 116 which may prevent axial separation between the seal ring 110 and the retainer 120.

Advantageously, the first prior art drive mechanism may provide robust drive with a high torque capacity (e.g. 100-500 Nm). Advantageously, in examples, the first prior art drive mechanism the seal ring 110 (e.g. primary ring) is not rigidly constrained by the retainer 120 (e.g. there is a clearance provided between the ear and the slot) therefore providing a seal ring which is not distorted by the retainer. Advantageously, the first prior art drive mechanism may provide permit axial movement between the retainer and the seal ring (e.g. in examples which do not comprise a flared portion as shown in FIG. 1B).

Disadvantageously, the first prior art drive mechanism is provided with a clearance between the ear and slot which can result in backlash (i.e. lost motion because of the clearance between the ear and the slot) which may result in large changes in acceleration (jerk) of the ear and/or slot when the angular speed of the retainer is varied. Disadvantageously, the clearance between the ear and slot may increase over time due to wear between the ear and slot (e.g. due to axial movement).

If the change in acceleration of the ear (due to a force applied by the slot) is above a critical value (dependent on the materials and geometry of the ear and slot) the ear and/or slot can be damaged. For example, FIG. 1C illustrates an example of the first prior art drive mechanism in which one of the edges of the slot has been damaged by the ear. In examples, the ear may be sheared from the seal ring annular portion.

A further disadvantage with the first prior art drive mechanism is that machining the retainer and the seal ring is complex and, therefore, time consuming and costly. Moreover, if one were to machine the first prior art drive mechanism to minimise the clearance described in the previous paragraph, this would be time consuming and costly, and eventually through continued wear between the ear and slot, the clearance would increase thereby resulting in the above problems.

FIG. 2A illustrates an axial cross-sectional view of a second prior art drive mechanism. FIG. 2B illustrates a perspective view of the second prior art drive mechanism illustrated in FIG. 2A. The second prior art drive mechanism may be referred to as a dent drive mechanism.

The second prior art drive mechanism 200 comprises: a seal ring 210 (e.g. a primary ring or a mating ring); and, a retainer 220.

The seal ring 210 comprises: a seal ring annular portion 212; and, a radially inward recess (e.g. a dent) 214. The radially inward recess 214 is a radial recess disposed in a seal ring radial outer surface of the annular portion 212.

The retainer 220 comprises: a retainer annular portion 222; and, a radially inward projection 224. The radially inward projection 224 is disposed on a retainer radial inner surface of the annular portion 222.

The seal ring annular portion 212 has an outer radius (e.g. the radius of the outer radial surface of the seal ring annular portion 212) which is less than the inner radius of the retainer annular portion 222 (e.g. the radius of an inner radial surface of the retainer annular portion 222). In other words, the retainer annular portion 222 is sized to receive and surround the seal ring annular portion 212. The radially inward projection 224 of the retainer 220 is sized to fit within the radially inward recess 214 of the seal ring 210.

When assembled for use, the seal ring annular portion 212 is disposed within the retainer annular portion 222 and the radially inward projection 224 is disposed within the radially inward recess 214. The radially inward projection 224 and the radially inward recess 214 provide a drive mechanism.

In use, the rotating apparatus provides a torque which rotates the retainer 220. As the retainer 220 rotates in response to the torque applied by the rotating apparatus, a torque is transferred from the retainer 220 to the seal ring 210. In more detail, the torque is transferred from the retainer 220 to the seal ring 210 via the driving mechanism provided by the radially inward projection 224 and the radially inward slot 214. Put another way, as the retainer 220 rotates, the radially inward projection 224 acts on the radially inward recess 214 within which the radially inward projection 224 is disposed, thereby forcing the seal ring 210 to rotate with the retainer 220.

In examples, such as that shown in FIG. 2A, the radially inward projection 224 has a curved profile and the radially inward recess 214 has a corresponding curved profile which complements that of the radially inward projection 224.

Advantageously, the second prior art drive mechanism may reduce the concentration of stress on the outer radial surface of the seal ring thereby reducing wear and risk of damage to the driving mechanism. Advantageously, in examples, the second prior art drive mechanism the seal ring 210 (e.g. primary ring) is not rigidly constrained by the retainer 220 (e.g. there is a clearance provided between the radially inward projection and the radially inward recess) therefore providing a seal ring which is not distorted by the retainer.

Advantageously, the second prior art drive mechanism may provide permit axial movement between the retainer and the seal ring. Advantageously, the second prior art drive mechanism may be easy simple to manufacture/machine which may reduce the time and cost of manufacture. Furthermore, the second prior art drive mechanism may be easy to assemble which may reduce the time and cost of manufacture.

Disadvantageously, the second prior art drive mechanism is provided with a clearance between the radially inward projection and radially inward recess which can result in backlash (i.e. lost motion because of the clearance between the radially inward projection and radially inward recess) which may result in large changes in acceleration (jerk) of the radially inward projection and/or radially inward recess when the angular speed of the retainer is varied. Disadvantageously, the clearance between the radially inward projection and radially inward recess may increase over time due to wear between the radially inward projection and radially inward recess (e.g. due to axial movement).

If the change in acceleration of the radially inward projection (due to a force applied by the slot) is above a critical value (dependent on the materials and geometry of the ear and slot) the radially inward projection and/or radially inward recess can be damaged. For example, FIG. 2B illustrates an example of the second prior art drive mechanism in which the radially inward recess has been damaged by the ear (i.e. there is a split in the seal ring at the point of the radially inward recess). In examples, the radially inward projection may be damaged/worn to the point at which it no longer engages (e.g. is disposed within) the radially inward recess.

FIG. 3A illustrates a longitudinal cross-sectional view of a third prior art drive mechanism. FIG. 3B illustrates a perspective view of the third prior art drive mechanism illustrated in FIG. 3A. The third prior art drive mechanism may be referred to as a pin drive mechanism.

The third prior art drive mechanism 300 comprises: a seal ring 310 (e.g. a primary ring or a mating ring); and, a retainer 320.

The seal ring 310 comprises: a seal ring annular portion 312; and, an axially recess 314.

The axially recess 214 is a recess disposed in an axial surface of the seal ring annular portion 312.

The retainer 320 comprises: a retainer annular portion 322; and, an axial projection 324 (e.g. a pin). The axial projection 324 is disposed on a axial surface of the annular portion 322.

The seal ring annular portion 312 has an outer radius (e.g. the radius of the outer radial surface of the seal ring annular portion 312) which is less than an inner radius of the retainer annular portion 322 (e.g. the radius of an inner radial surface of the retainer annular portion 322). In other words, the retainer annular portion 322 is sized to receive and surround the seal ring annular portion 312. The axial projection 324 of the retainer 320 is sized to fit within the axial recess 314 of the seal ring 310. In examples, the axial projection and axial recess both have axial cross-sections which have a circular shape, wherein the axial cross-section of the axial projection has a smaller diameter than that of the axial cross-section of the axial recess thereby providing a clearance therebetween.

When assembled for use, the seal ring annular portion 312 is disposed within the retainer annular portion 322 and the axial projection 324 is disposed within the axial recess 314. The axial projection 324 and the axial recess 314 provide a drive mechanism.

In use, the rotating apparatus provides a torque which rotates the retainer 320. As the retainer 320 rotates in response to the torque applied by the rotating apparatus, a torque is transferred from the retainer 320 to the seal ring 310. In more detail, the torque is transferred from the retainer 320 to the seal ring 310 via the driving mechanism provided by the axial projection 324 and the axial recess 314. Put another way, as the retainer 320 rotates, the axial projection 324 acts on the axial recess 314 within which the axial projection 324 is disposed, thereby forcing the seal ring 310 to rotate with the retainer 320.

Advantageously, in examples, the third prior art drive mechanism the seal ring 310 (e.g. primary ring) is not rigidly constrained by the retainer 320 (e.g. the axial projection and the axial recess permit axial movement therebetween) therefore providing a seal ring which is not distorted by the retainer. Put in other words, the retainer does not radially compress the seal ring. Advantageously, the third prior art drive mechanism may provide permit axial movement between the retainer and the seal ring. Advantageously, the third prior art drive mechanism may be easy simple to manufacture/machine which may reduce the time and cost of manufacture. Furthermore, the third prior art drive mechanism may be easy to assemble which may reduce the time and cost of manufacture.

Disadvantageously, the third prior art drive mechanism is provided with a clearance between the axial projection and the axial recess which can result in backlash (i.e. lost motion because of the clearance the axial projection and the axial recess) which may result in large changes in acceleration (jerk) of the radially inward projection and/or radially inward recess when the angular speed of the retainer is varied. Disadvantageously, the clearance between the axial projection and the axial recess may increase over time due to wear between the axial projection and the axial recess (e.g. due to axial movement).

If the change in rotatory acceleration of the axial projection and the axial recess (due to a force applied by the slot) is above a critical value (dependent on the materials and geometry of the ear and slot) the axial projection and the axial recess can be damaged. For example, FIG. 3B illustrates an example of the third prior art drive mechanism in which the axial recess has been damaged by the axial projection (i.e. there is damage to the axial surface of the seal ring surrounding the axial recess). In examples, the axial projection may be damaged/worn to the point at which it no longer engages (e.g. is disposed within) the axial recess.

FIG. 4 illustrates a longitudinal cross-sectional view of a fourth prior art drive mechanism. The fourth prior art drive mechanism may be referred to as an interference fit drive mechanism.

The third prior art drive mechanism 400 comprises: a seal ring 410 (e.g. a primary ring or a mating ring); and, a retainer 420.

The seal ring 410 has an annular shape with an outer radial surface 412 (e.g. a radially outward facing surface). The retainer 420 has an annular shape with an inner radial surface 422 (e.g. a radially inward facing surface).

The seal ring 410 has an outer radius (the radius of the outer radial surface 412 of the seal ring) which is the same as the inner radius of the retainer 420 (the radius of the inner radial surface 422 of the retainer). In other words, the retainer 420 is sized to receive and surround and the seal ring 410. The retainer 420 and the seal ring 410 are sized to form an interference fit e.g. the retainer and seal ring are shaped and sized to engage by friction.

When assembled for use, the seal ring 410 is disposed within the retainer 420 and the outer radial surface 412 contacts the inner radial surface 422. Friction between the inner radial surface 422 of the retainer 420 and the outer radial surface 412 of the seal ring 410 provide a drive mechanism.

In use, the rotating apparatus provides a torque which rotates the retainer 420. As the retainer 420 rotates in response to the torque applied by the rotating apparatus, a torque is transferred from the retainer 420 to the seal ring 410. In more detail, the torque is transferred from the retainer 420 to the seal ring 410 by the drive mechanism provided by the friction between the inner radial surface 422 and the outer radial surface 410. Put another way, as the retainer 420 rotates, a frictional force between the inner radial surface 422 of the retainer 420 and the outer radial surface 410 of the seal ring 410 forces the seal ring 410 to rotate with the retainer 420.

The fourth prior art drive mechanism necessarily does not have a clearance between the inner radial surface 422 and the outer radial surface 410 because these surfaces need to be in contact to provide sufficient friction to transfer torque between the retainer 420 and the seal ring 410. Advantageously, the fourth prior art drive mechanism does not experience backlash because the clearance between the inner radial surface 422 and the outer radial surface 410 is zero. A further advantage is that the interference fit acts a secondary seal and, therefore, additional sealing components (e.g. O-rings) may be dispensed with, thereby simplifying construction (e.g. reducing time and cost of manufacture).

Disadvantageously, the fourth prior art drive mechanism requires accurate machining of the components and the components need to be heated during assembly which adds time and cost to the manufacture of the seal arrangement. Another disadvantage is that the interference fit between the retainer and the seal ring may distort the seal ring and, furthermore, the interference fit may be affected by thermal growth of dissimilar materials in use, both of which may which may have a negative effect of the seal performance. Disadvantageously, an interference drive fit is typically not suitable for use in high pressure sealing applications (e.g. pressures over 40 barg (outside the scope of API682). A further disadvantage is that there is no positively engaged rotational stop as the drive mechanism relies solely on friction between the retainer and the seal ring. Another disadvantage is that axial movement in the seal arrangement cannot be provided between the retainer and the seal ring and therefore, axial movement must be provided elsewhere in the seal assembly.

SUMMARY

Aspects of the invention are set out in the independent claims and optional features are set out in the dependent claims and aim to address the above described technical problems, and related problems. Aspects of the disclosure may be provided in conjunction with each other, and features of one aspect may be applied to other aspects.

An aspect of the disclosure provides a seal arrangement for an apparatus comprising: a housing; and, a rotatable component disposed within the housing; wherein the rotatable component is configured to rotate at a variable angular speed about a rotational axis, the seal arrangement comprising: a first seal assembly configured to be disposed on the rotatable component of the apparatus and to rotate around the rotational axis, the first seal assembly comprising: a first retainer; a first seal face; wherein: the first seal face is disposed within the first retainer; and, the first retainer is configured to provide a rotary driving force to the first seal face to thereby rotationally drive the first seal face; a first cushioning member disposed between the first seal face and the first retainer, wherein the first cushioning member is configured to dampen the rotary driving force provided by the first retainer to the first seal face; a second seal assembly configured to be disposed on the housing: a second retainer; a second seal face; wherein: the second seal face configured to be disposed within the second retainer; wherein the first seal face is disposed in contact with the second seal face to thereby seal against egress of fluid between the first seal face and the second seal face.

In use, the retainer is driven at a variable angular speed forces of changing magnitude are exerted on the seal face by the retainer (e.g. there is a jerk exerted on the seal face by the retainer). Advantageously, the cushioning member dampens the forces exerted on the seal face by the retainer thereby reducing the likelihood of damage to the seal face or retainer.

The seal arrangement described herein is for use with an apparatus with a rotatable component configured to rotate at a variable angular speed about a rotational axis.

The rotatable component of the apparatus may rotate at an angular speed which is a function of time i.e. the angular speed of the rotatable component changes with time e.g. the speed might have a sinusoidal form, that is a fixed period over which the speed varies between a minimum and maximum speed. Therefore, the variable angular speed may refer to an angular speed which varies continuously during operation of the apparatus.

In examples, the rotatable component of the apparatus, starts from zero angular speed to a constant angular speed for a period of time and after some time the rotatable component is slowed down and stopped (e.g. for maintenance, troubleshooting etc.). Therefore, the variable angular speed may refer to the increase in angular speed from zero to the constant angular speed when the rotatable component is started and/or the decrease in angular speed from the constant angular speed to zero when the rotatable component is stopped. In such examples, the apparatus may be a unidirectional pump wherein in use, the rotation of the rotatable component is configured to move a fluid.

In examples, the seal assembly may be configured to withstand shock loading. Shock loading refers to a sudden changes of load (e.g. torque) on a sealing ring of the assembly (e.g. the primary ring and/or mating ring) imparted by a retainer of the assembly. To protect the sealing ring from damage due to the retainer of the assembly, the seal assembly may comprise a cushioning member disposed between the retainer and the sealing ring. The cushioning member may be a deformable member for absorbing the force associated with said shock loading to thereby prevent damage of the sealing ring.

In examples, the seal ring may be formed of a brittle material (e.g. silicon carbide) and the retainer may be formed of a hard metal (e.g. steel). In such examples, forces exerted on the seal face by the retainer may be liable to break the seal ring (e.g. shear off a portion of the seal ring because of the seal ring's relative brittleness in comparison to the retainer). Advantageously, providing a cushioning member between the seal ring and the retainer may reduce the likelihood of damage.

The term brittle refers to a material that fractures when subjected to stress with a limited amount of deformation before fracture. Brittle materials may characterized by relatively little deformation when subjected to a load, poor capacity to resist impact and vibration of load, relatively high compressive strength, and relatively low tensile strength. Most of inorganic non-metallic materials are brittle materials.

Advantageously, a driving mechanism is provided wherein backlash is removed. The cushioning member is compressed (e.g. squeezed) between the retainer and the seal face to occupy clearance between the retainer and the seal face. Occupying the clearance prevents or reduces backlash. There may be a small amount of backlash (e.g. compared to if no cushioning member were provided) due to the compliance (i.e. the inverse of stiffness) of the material.

The retainer and seal face may be manufactured to provide a radial clearance therebetween which may increase the amount of acceptable tolerance to which the components are manufactured and in turn, advantageously may reduce the time and/or cost of manufacturing these parts. A further advantage is that it may be more simple to assemble aspects of the disclosure in comparison to prior art drive mechanisms e.g. less time and/or money required to assemble aspects of the disclosure in comparison to prior art drive mechanisms.

Advantageously, the cushioning member may provide a seal between the seal face and the retainer or other mechanical seal component.

The first seal face may comprise a radially outward facing circumferential surface comprising first seal face surface features; and, the first retainer may comprise a radially inward facing circumferential surface comprising first retainer surface features; wherein the first seal face surface features correspond to the first retainer surface features to thereby permit torque to be transferred from the first retainer to the first seal face.

The first seal face surface features may comprise: a plurality of flat portions; and, a plurality of curved portions; and, the first retainer surface features may comprise: a plurality of flat portions; and, a plurality of curved portions; wherein each of the flat portions on the first retainer correspond to a respective flat portion on the first seal face, and each of the curved portions on the first retainer correspond to a respective curved portion on the first seal face.

Advantageously, aspects of the disclosure provide a robust drive mechanism (e.g. complementary drive flats with a cushioning member therebetween to prevent damage) which is not susceptible to fatigue of either the seal face or the retainer because the cushioning member prevents or reduces wear of the seal face and retainer due to friction therebetween.

Advantageously aspects of the disclosure provide a driving mechanism which transmit torque from the retainer to the seal face by mechanical engagement of complementary drive flats on the retainer and the seal face. Advantageously, the driving mechanism described herein may not depend solely on friction to transmit torque from the retainer to the seal face as is the case in interference fit drive mechanisms (see e.g. FIG. 4). The drive flats may act as a torque "overload" feature if the cushioning member becomes fully compressed.

The cushioning member may be compressed by the first seal assembly so that the compression of the cushioning member on the flat portions is a function of the position along the flat portion.

The seal face may be configured to provide a selected amount of compression of the cushioning member. The retainer may be configured to provide a selected amount of compression of the cushioning member.

The seal face may comprise a radial groove configured to receive the cushioning member. In examples, the radial groove may receive a portion of the cushioning member and a portion of the cushioning member may extend out of the radial groove.

The cushioning member may be a unitary element, for example, wherein the unitary element is an O-ring.

Advantageously, an O-ring may be used as the cushioning member which may negate the need to use custom mouldings to manufacture the cushioning members (e.g. so-called off-the-shelf O-rings may be used. An advantage with using O-rings may be that they are widely available with a wide choice of materials having a variety of different properties. For example, an O-ring may be selected with suitable properties (e.g. O-ring durometer hardness, O-ring section diameter) for the drive mechanism provided herein without the need for the cushioning member to be specially made for this purpose.

The cushioning provided by the cushioning member may be "tuned" to suit specific applications by changing variables such a number of drive flats, initial O-ring compression, O-ring durometer hardness, O-ring section diameter.

The cushioning member may comprise any of: a perfluoroelastomer; and, a fluoropolymer elastomer, for example, Viton (RTM). In examples, the cushioning member may comprise at least one of the following materials: nitrile; chloroprene; ethylene; propylene; fluorocarbon; perfluoroelastomer; and, polytetrafluoroethylene.

At least one of: the first seal face; and, the second seal face; is movable in an axial direction. Advantageously the cushioning member permits axial movement of one or more of the seal faces may allow the seal to accommodate and continue to seal even when relative axial movement of the rotating shaft (rotor) versus the casing (stator) occurs. For example, relative axial movement of the seal faces may occur when the shaft undergoes thermal growth with temperature change, or movement of the shaft within machine bearing limits of free play under thrust loading.

Advantageously the cushioning member may isolate the seal face from hard contact with the metal retainer. The contact between the seal face and the retainer may be provided via the cushioning member which may provide a deformable, cushioned, contact which distributes loads over a wider area reducing distortion of the seal ring. Therefore, uncontrolled distortion of the seal ring which is undesirable may be avoided because it can affect the flatness and presentation of the primary sealing surface leading to poor sealing performance.

The apparatus may be a pump and the rotatable component may comprise a shaft connected to a rotor, wherein the shaft extends through a wall of the housing and the rotor is disposed within the housing, wherein the shaft, in use, rotates around the rotational axis at a varying angular speed, wherein the retainer of the first seal assembly is connected to the shaft and the retainer of the second seal assembly is connected to the housing to thereby provide a seal which prevents or reduces egress of process fluid from the housing along the shaft.

An aspect of the disclosure provides use of a seal arrangement as described herein with a concentric reciprocating, CR, pump. The CR pump may comprise: a first shaft connected to a first rotor and a second shaft connected to a second rotor, and a housing, wherein the first shaft extends through a wall of the housing and the first rotor is disposed within the housing, and the second shaft extends through a wall of the housing and the second rotor is disposed within the housing, wherein the housing comprises: an inlet aperture configured to provide therethrough fluid to an interior of the housing from an exterior of the housing; an outlet aperture configured to provide therethrough fluid from the interior of the housing to the exterior of the housing; and wherein the first rotor configured to rotate around a rotational axis so that an outer circumferential face of the first rotor rotates adjacent an inner circumferential face of the housing and the second rotor is configured to rotate around a rotational axis so that an outer circumferential face of the second rotor rotates adjacent an inner circumferential face of the housing; wherein: the first rotor has a plurality of radially inwardly directed wings and the second rotor has a plurality of radially outwardly directed wings; and, in use, the first rotor rotates around the rotational axis at a first varying angular speed and the second rotor rotates around the rotational axis at a second varying angular speed, thereby moving the wings of the first rotor relative to the wings of the second rotor in a reciprocating manner thereby providing periodical expansion and contraction of chambers between the respective wings; wherein: expansion of each of the chambers between the respective wings is configured to draw fluid into each of the chamber via the inlet aperture; contraction of each of the chambers between the respective wings is configured to expel fluid from each of the chambers via the outlet aperture. In such examples, a seal arrangement may be provided wherein the retainer of the first seal assembly is connected to the first shaft (e.g. outside of the housing) and the retainer of the second seal assembly is connected to the housing (e.g. on an exterior part of the housing) to provide a seal to thereby prevent egress of process fluid from the pump along the shaft.

An aspect of the disclosure provides a method of installing a seal to a concentric reciprocating pump, the method comprising: providing a seal arrangement, wherein the first seal assembly configured to be disposed on the rotatable component of the apparatus and to rotate around the rotational axis, the first seal assembly comprising: a first retainer; a first seal face; wherein: the first seal face is disposed within the first retainer; and, the first retainer is configured to provide a rotary driving force to the first seal face to thereby rotationally drive the first seal face; a first cushioning member disposed between the first seal face and the first retainer, wherein the first cushioning member is configured to dampen the rotary driving force provided by the first retainer to the first seal face; a second seal assembly configured to be disposed on the housing: a second retainer; a second seal face; wherein: the second seal face configured to be disposed within the second retainer; wherein the first seal face is disposed in contact with the second seal face to thereby seal against egress of fluid between the first seal face and the second seal face; and, installing the first seal assembly to a first shaft of the concentric reciprocating pump (described above); installing the second seal assembly to a housing of the concentric reciprocating pump.

An aspect of the disclosure provides use of a drive face seal arrangement in a variable angular speed pump (or compressor), wherein the drive face seal arrangement comprises a plurality of drive face seals configured to provide a seal between a plurality of rotors of the pump and a stationary casing.

DRAWINGS

Embodiments of the disclosure will now be described, by way of example only, with reference to the accompanying drawings, in which.

In the figures, like reference signs denote like elements.

SPECIFIC DESCRIPTION

The present disclosure relates to a seal arrangement comprising a first and a second seal assembly. The first seal assembly is configured to rotate in use whereas the second seal assembly is configured to remain stationary in use. The first seal assembly comprises a retainer, a seal face and a cushioning member disposed therebetween wherein the cushioning member is configured to dampen a rotary driving force provided by the retainer to the seal face. The second seal assembly comprises a retainer and a seal face. The seal face of the first seal assembly opposes and abuts the seal face of the second seal assembly to thereby provide a seal. In the following description, the first seal assembly is described in isolation and then subsequently described in described in the context of its use i.e., wherein the seal assembly is disposed in a rotating equipment (e.g. a concentric reciprocating pump).

The seal arrangement of the present disclosure is a mechanical seal, and the seal assemblies are one of a mating ring and a primary ring. In examples wherein the mating ring is configured to rotate and the primary ring is configured to remain stationary, the mating ring may be referred to as a rotating seal assembly and the primary ring may be referred to as a stationary seal assembly.

In examples wherein the mating ring is configured to remain stationary and the primary ring is configured to rotate, the mating ring may be referred to as a stationary seal assembly and the primary ring may be referred to as a rotating seal assembly. In examples the mating ring may be configured to rotate at a first angular speed and the primary ring may be configured to rotate at a second angular speed. In such examples, the primary ring may be referred to as a first rotating seal assembly and the mating ring may be referred to as a second rotating seal assembly.

Figure 5A:
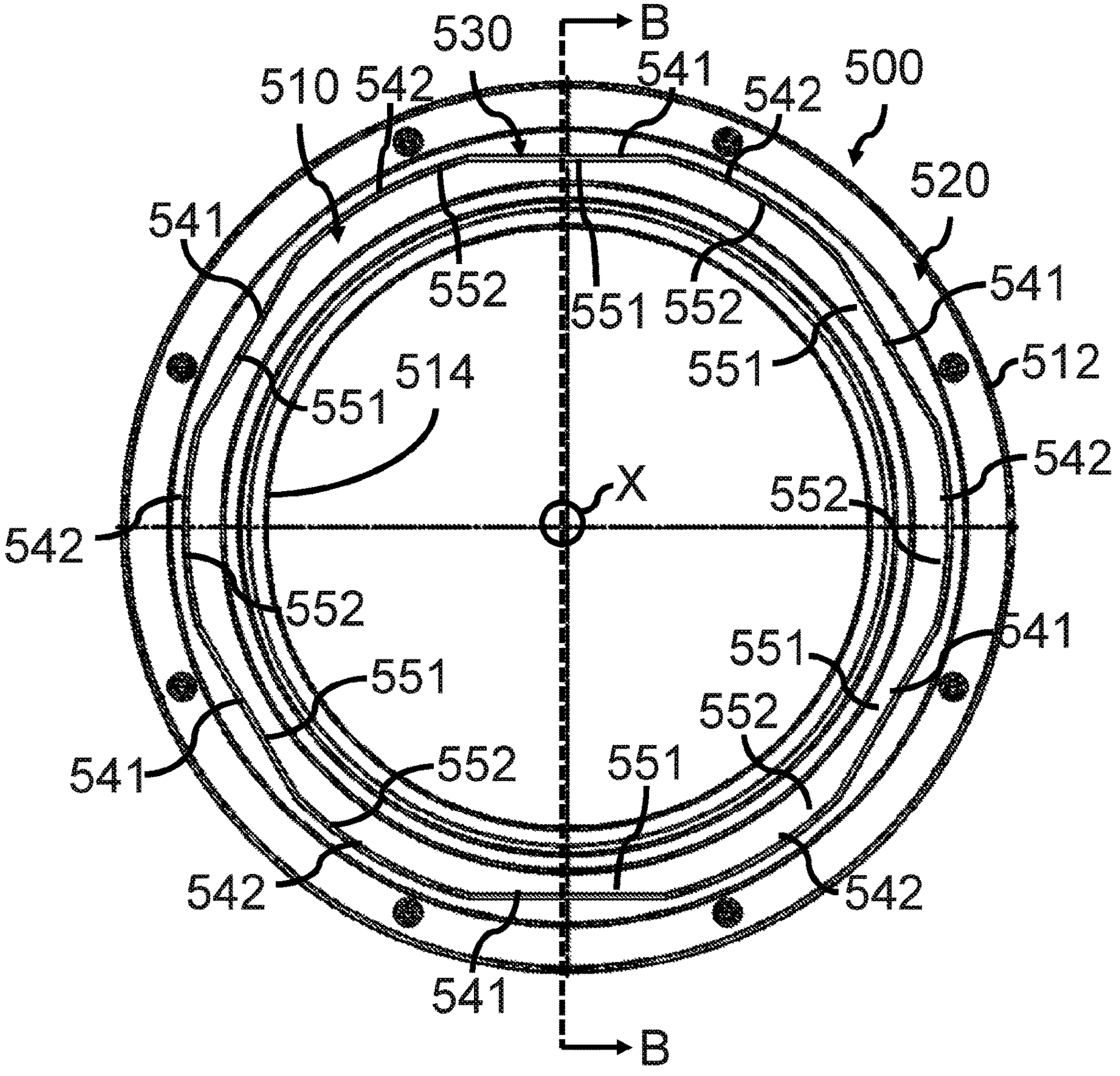
FIG. 5A illustrates an axial plan view of a seal assembly of embodiments of the disclosure.
Figure 5B:
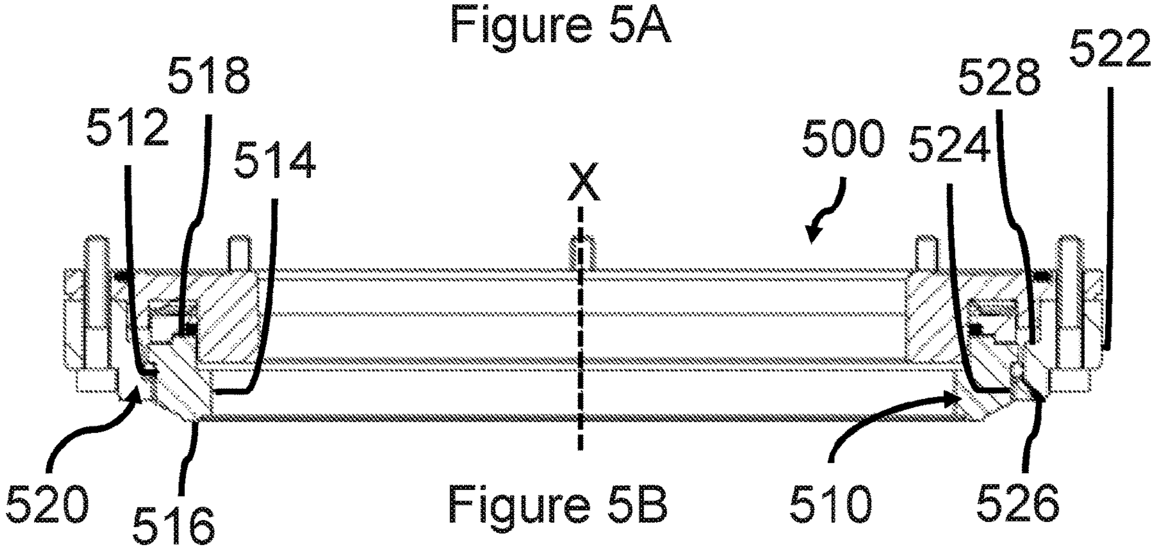
FIG. 5B illustrates a cross-sectional view of the seal assembly of FIG. 5A along plane B-B.
Figure 5C:
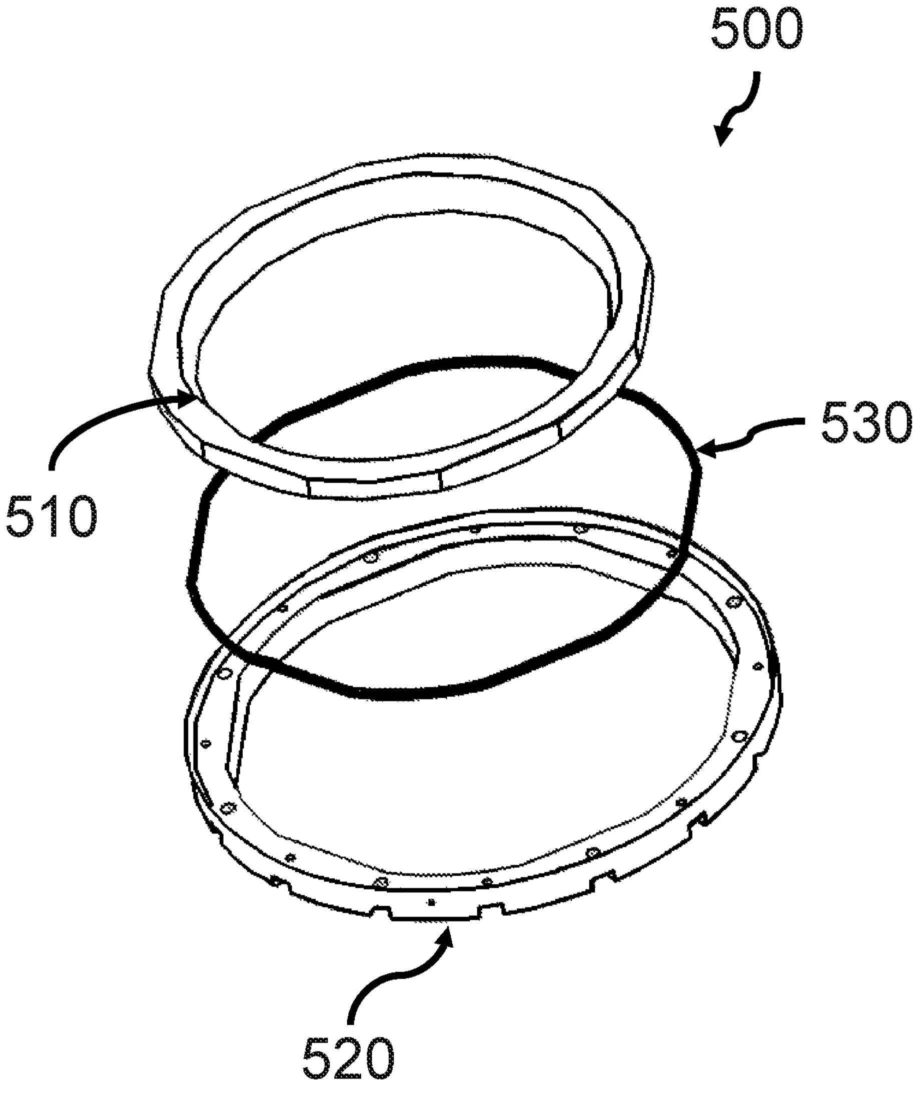
FIG. 5C illustrates an exploded perspective view of the seal assembly of FIG. 5A.
Figure 5D:
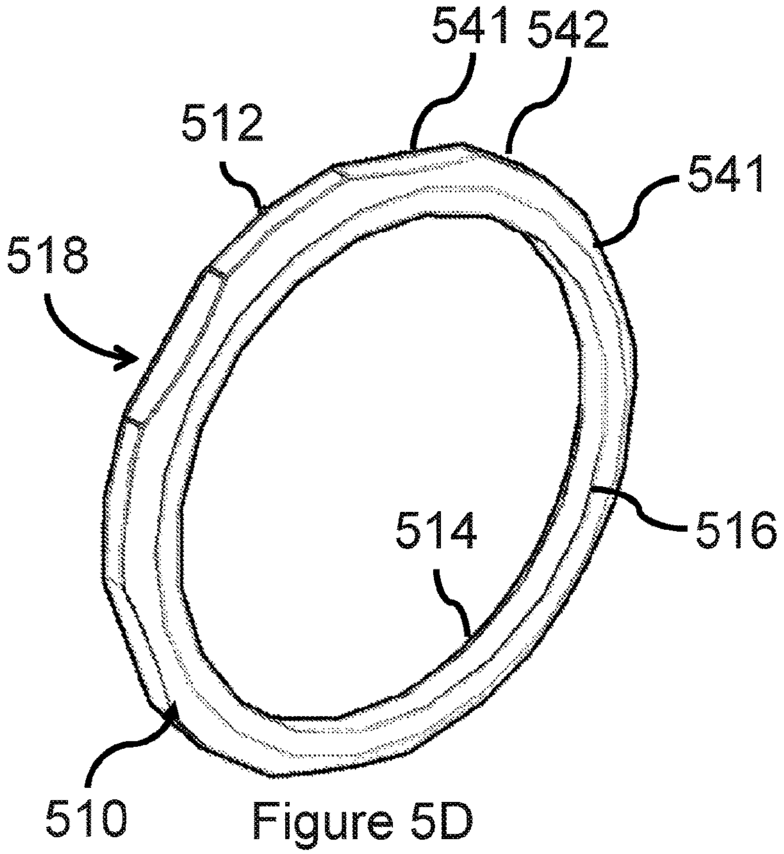
FIG. 5D illustrates a perspective view of the seal face of the seal assembly illustrated in FIG. 5A.
Figure 5E:
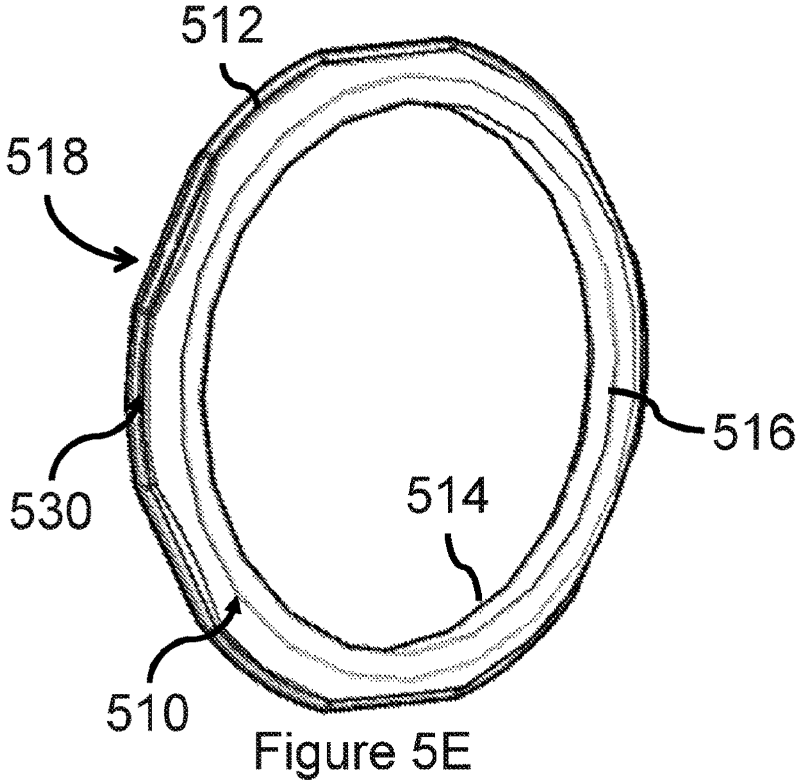
FIG. 5E illustrates a perspective view of the seal face and cushioning member of the seal assembly illustrated in FIG. 5A.

FIG. 5A illustrates an axial plan view of a seal assembly of embodiments of the disclosure; FIG. 5B illustrates a cross-sectional view of the seal assembly of FIG. 5A along plane B-B; FIG. 5C illustrates an exploded perspective view of the seal assembly of FIG. 5A; FIG. 5D illustrates a perspective view of the seal face of the seal assembly illustrated in FIG. 5A; FIG. 5E illustrates a perspective view of the seal face and cushioning member of the seal assembly illustrated in FIG. 5A.

The seal assembly 500 comprises: a seal face 510; a retainer 520; and, a cushioning member 530.

The seal face 510 has an annular shape. The seal face 510 has: an outer radial surface 512 (e.g. a radially outward facing surface); an inner radial surface 514 (e.g. a radially inward facing surface); a front axial surface 516; a back axial surface 518. The outer radial surface 512 is connected to the front axial surface 516 and the back axial surface 518. The inner radial surface 514 is connected to the front axial surface 516 and the back axial surface 518. The front axial surface 516 is connected to outer radial surface 512 and the inner radial surface 514. The back axial surface 518 is connected to outer radial surface 512 and the inner radial surface 514.

The outer radial surface 512 of the seal face 510 comprises a plurality of seal face drive flats 541 and a plurality of seal face curved portions 542 (also referred to herein as seal face diameters). The seal face drive flats 541 and the seal face curved portions 542 are disposed along the outer radial surface 512 in an alternating fashion e.g. moving around the outer radial surface 512 there is disposed a seal face drive flat 541 then a seal face curved portion 542 and then a seal face drive flat 541 and so on. In other words: each seal face drive flat 541 disposed on the outer radial surface 512 is bordered on each side by a seal face curved portion 542; each seal face curved portion 542 disposed on the outer radial surface 512 is bordered on each side by a seal face drive flat 541.

The seal face drive flats 541 may be characterised by a length referred to as a seal face drive flat length. The seal face drive flat length is defined as the length along the outer radial surface 512 of the seal face 510 from a first seal face curved portion 542 which borders a seal face drive flat 551 to a second seal face curved portion 542 which borders the seal face drive flat 551.

The seal face curved portions 542 may be characterised by a length referred to as a seal curved portion length. The seal face curved portion length is defined as the length along the outer radial surface 512 of the seal face 510 from a first seal face drive flat 541 which borders a seal face curved portion 542 to a second seal face drive flat portion 541 which borders the seal face curved portion 542.

The retainer 520 has an annular shape. The retainer 520 has: an outer radial surface 522 (e.g. a radially outward facing surface); an inner radial surface 524 (e.g. a radially inward facing surface); a front axial surface 526; a back axial surface 528. The outer radial surface 522 is connected to the front axial surface 526 and the back axial surface 528. The inner radial surface 524 is connected to the front axial surface 526 and the back axial surface 528. The front axial surface 526 is connected to outer radial surface 522 and the inner radial surface 524. The back axial surface 528 is connected to outer radial surface 522 and the inner radial surface 524.

The inner radial surface 524 of the retainer 520 comprises a plurality of retainer drive flats 551 and a plurality of retainer curved portions 552 (also referred to herein as retainer diameters). The retainer drive flats 551 and the retainer curved portions 542 are disposed along the inner radial surface 524 in an alternating fashion e.g. moving around the inner radial surface 524 there is disposed a retainer drive flat 551 then a retainer curved portion 552 and then a retainer drive flat 551 and so on. In other words: each retainer drive flat 551 disposed on the inner radial surface 524 is a bordered on each side by a retainer curved portion 552; each retainer curved portion 552 disposed on the inner radial surface 524 is bordered on each side by a retainer drive flat 551.

The retainer drive flats 551 may be characterised by a length referred to as a retainer drive flat length. The retainer drive flat length is defined as the length along the inner radial surface 524 of the retainer 520 from a first retainer curved portion 552 which borders a retainer drive flat 551 to a second retainer curved portion 552 which borders the retainer drive flat 551.

The retainer curved portions 552 may be characterised by a length referred to as a retainer curved portion length. The retainer curved portion length is defined as the length along the inner radial surface 524 of the retainer 520 from a first retainer drive flat 551 which borders a retainer curved portion 552 to a second retainer drive flat portion 551 which borders the retainer curved portion 552.

The seal face drive flat length is less than or approximately the same as the retainer drive flat length. The seal face curved portion length is less than or approximately the same as the retainer curved portion length.

The seal face 510 is sized so that it is disposable within the retainer 520. The seal face 510 is sized so that the radial outer surface 512 of the seal face 510 fits within the region delimited by the radial inner surface 524 of the retainer 520 e.g. so that the radial outer surface 512 opposes the radial inner surface 524. The seal face 510 and the retainer 520 are sized so that when the seal face 510 is disposed within the retainer 520 there is a clearance (i.e. a radial gap) between the radial outer surface 512 and the radial inner surface 524.

Figure 1A:
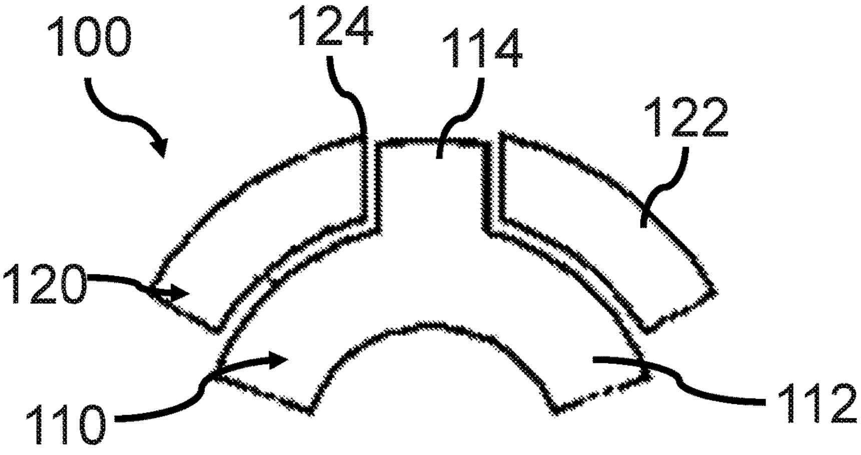
FIG. 1A illustrates an axial cross-sectional view of a first prior art drive mechanism.
Figure 1B:
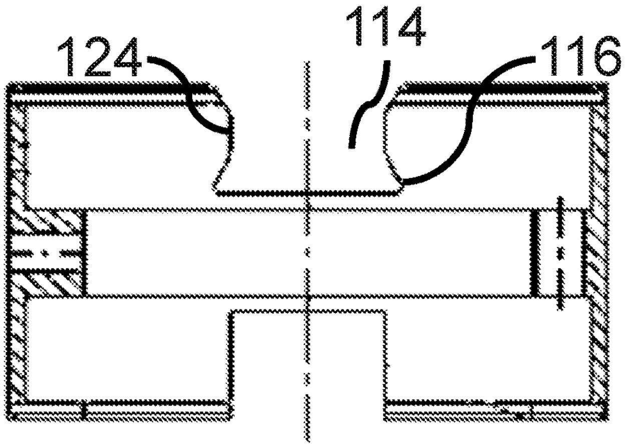
FIG. 1B illustrates a lateral plan view of the first prior art drive mechanism illustrated in FIG. 1A.
Figure 1C:
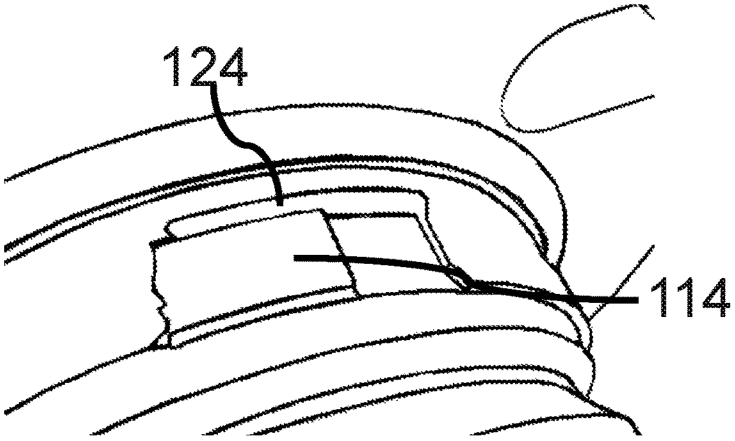
FIG. 1C illustrates a perspective view of the first prior art drive mechanism illustrated in FIGS. 1A and 1B.
Figure 2A:
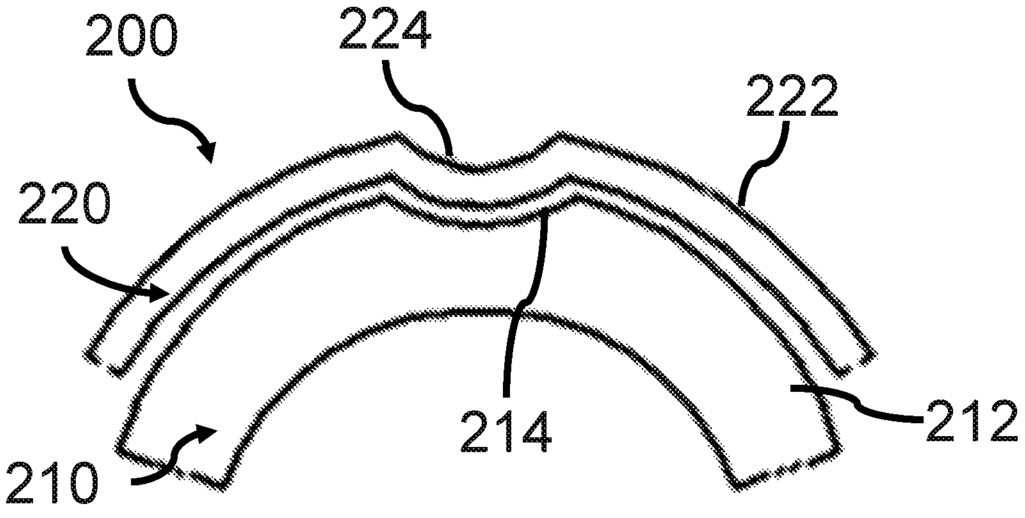
FIG. 2A illustrates an axial cross-sectional view of a second prior art drive mechanism.
Figure 2B:
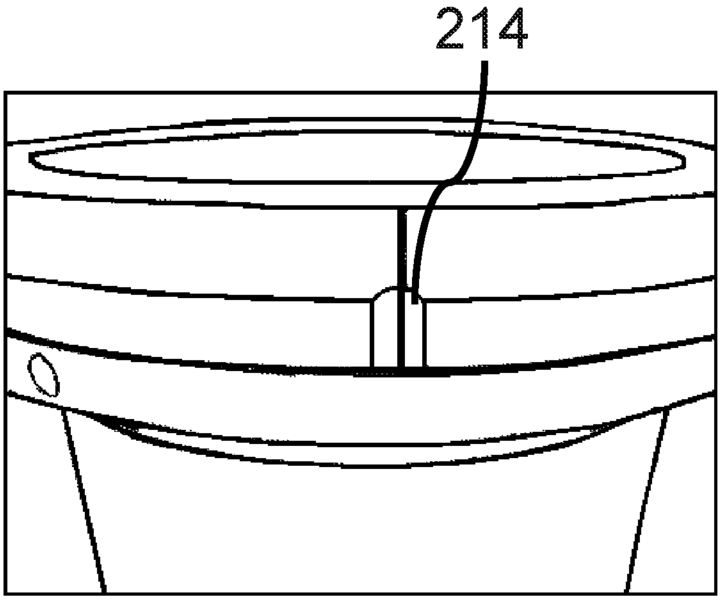
FIG. 2B illustrates a perspective view of the second prior art drive mechanism illustrated in FIG. 2A.
Figure 3A:
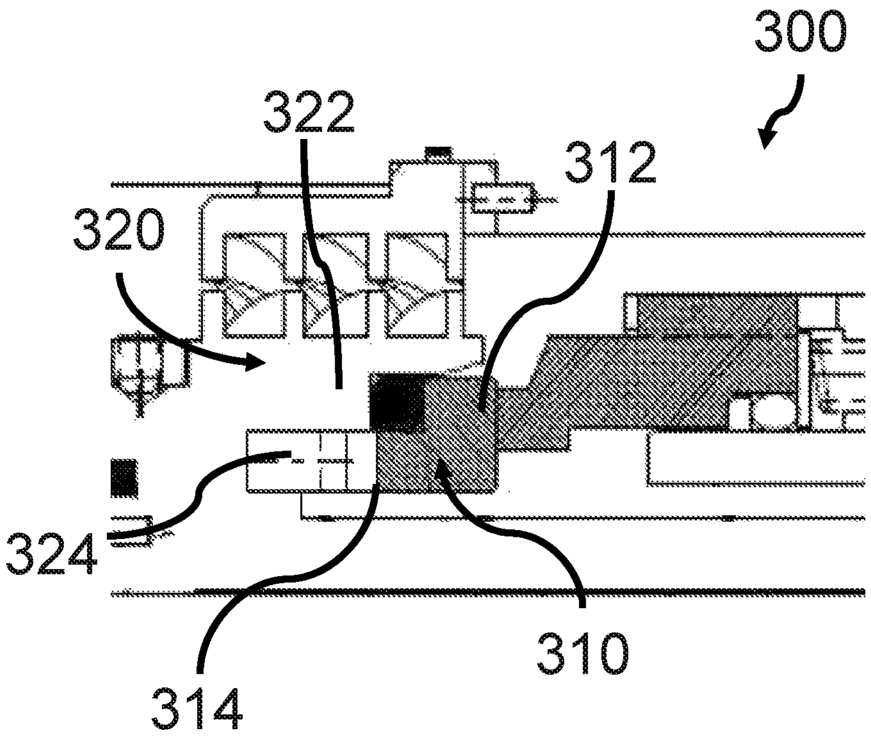
FIG. 3A illustrates a longitudinal cross-sectional view of a third prior art drive mechanism.
Figure 3B:
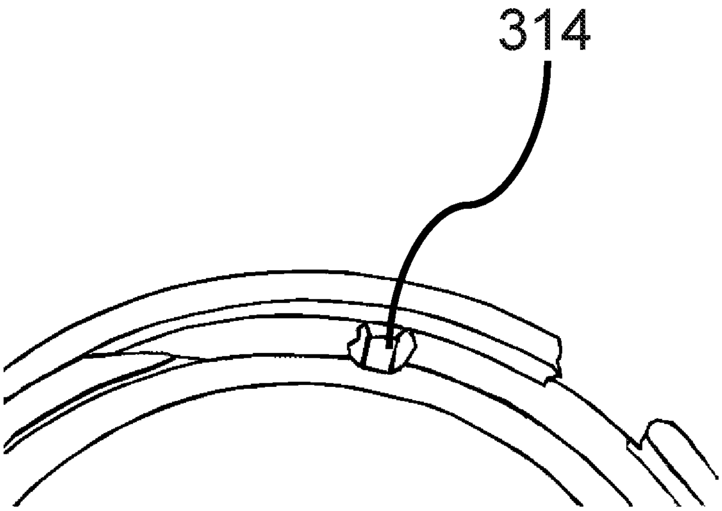
FIG. 3B illustrates a perspective view of the third prior art drive mechanism illustrated in FIG. 3A.
Figure 4:
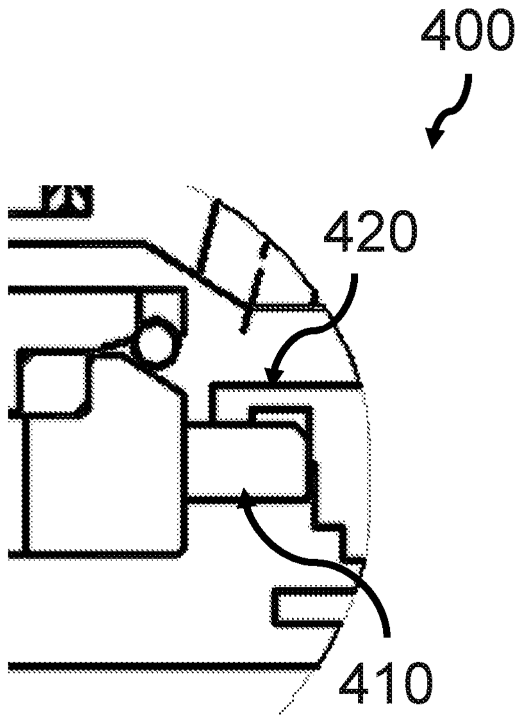
FIG. 4 illustrates a longitudinal cross-sectional view of a fourth prior art drive mechanism.

A clearance is provided between the seal face 510 and the retainer 520. Advantageously, providing a clearance allows both of the seal face 510 and the retainer 520 to be formed to relatively low tolerance and also allows assembly of the seal assembly to be faster (e.g. in comparison to an interference fit drive mechanism such as that illustrated in FIG. 4).

The cushioning member 530 has an annular shape. The cushioning member 530 is deformable e.g. has a compliance. The material of the cushion member may be determined by selecting an appropriate material and thickness. For example, the cushioning member may comprises any of: nitrile; chloroprene; ethylene; propylene; fluorocarbon; perfluoroelastomer; and, polytetrafluoroethylene. In the example shown in FIG. 5A the cushioning member is an O-ring. The O-ring which is provided as cushioning member 530 therefore mediates the rotational forces applied to the seal face 510 by the retainer 520. The O-ring prevents sharp changes in force to the seal face 510 and, therefore, protecting the seal face 510 from damage. The O-ring which is provided as cushioning member 530 does not provide a seal per se, instead it serves a protective function (i.e. preventing the seal face 510 from damage).

The seal face may comprise a radial groove which extends circumferentially around the seal face wherein the radial groove is configured to receive at least a portion of the cushioning member.

The cushioning member 530 is disposable in the clearance between the radial outer surface 512 and the radial inner surface 524 i.e. the cushioning member 530 is disposed around the outer radial surface 512 of the seal face 510. The cushioning member 530 deforms to conform to the shape of the outer radial surface 512. In more detail the cushioning member 530 deforms from an annular shape (i.e. having a circular cross section) to the shape of the outer radial surface 512 of the seal face 510 i.e. the cushioning member has alternating flat portions and curved portions.

The cushioning member 530 reduces the effective clearance between the seal face 510 and the retainer 520. Comparatively, the backlash in a seal assembly comprising the seal face 510, the retainer 520 and the cushioning member 530 is less than in another assembly comprising the seal face 510 and the retainer 520 (and no cushion member). Therefore, it is advantageous to provide the cushioning member 530 because it reduces backlash in use.

In use, the seal assembly illustrated in FIG. 5A is rotated at a variable angular speed about the central longitudinal axis X. The seal assembly may be rotated at a variable angular speed in a particular rotational direction e.g. rotated clockwise around central longitudinal axis X shown in FIG. 5A wherein the variable angular speed has a sinusoidal form. The seal assembly may be rotated at a variable angular speed with reversals of rotational direction e.g. rotated clockwise around central longitudinal axis X for a first period of time then subsequently rotated anticlockwise around central longitudinal axis X for a second period then subsequently rotated clockwise etc.

In particular, in use, the retainer 520 is rotated at a variable angular speed. The retainer flats 551 engage the cushioning member 530 flats which in turn engage the seal face flats 541 i.e. a torque is applied by the retainer flats 551 to the seal face flats 541 via the cushioning member. The cushioning member 530 dampens the force imparted on the seal face flats 541 and the retainer flats 551.

Figure 6:
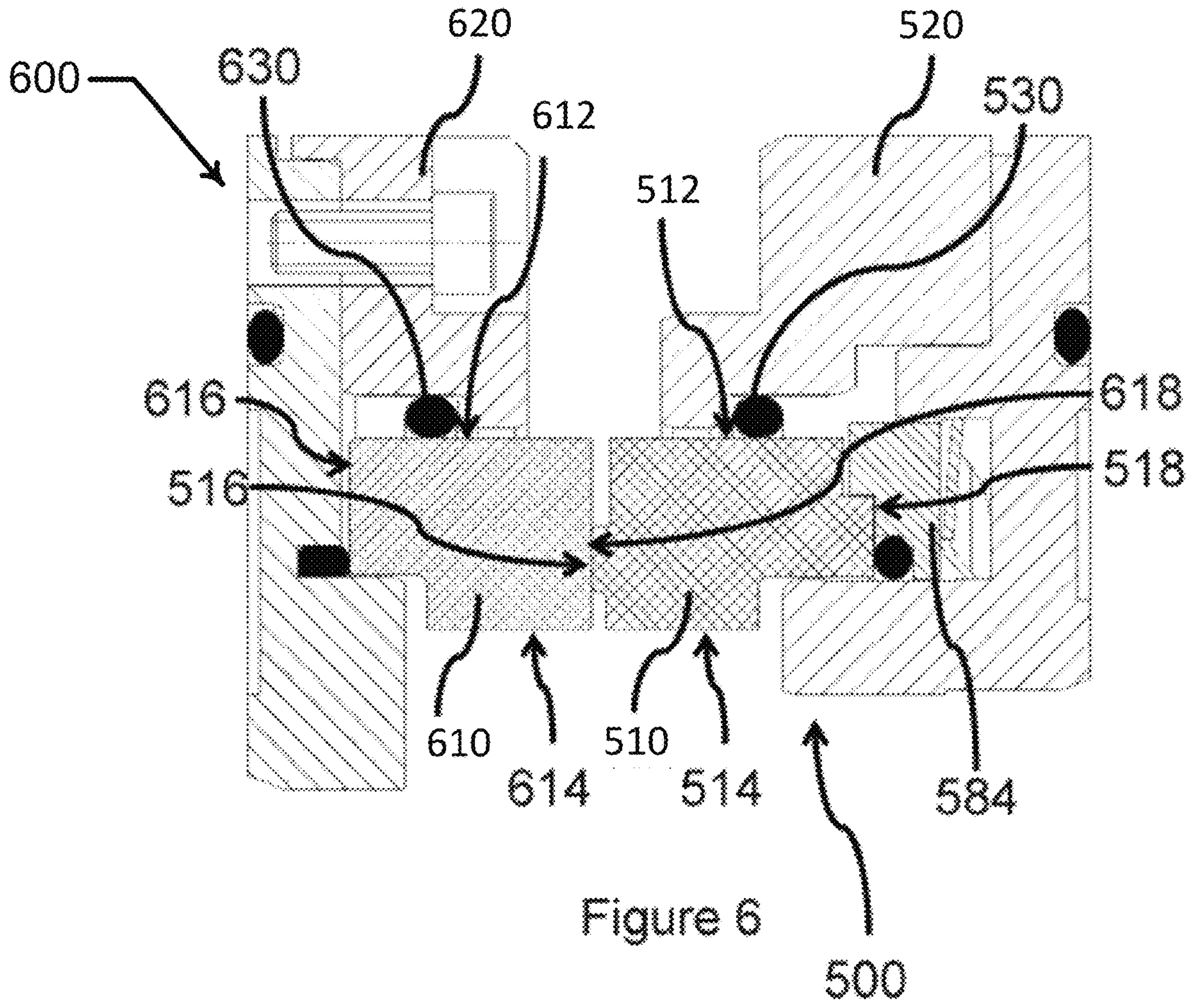
FIG. 6 illustrates a longitudinal cross-sectional view of a seal arrangement comprising the first seal assembly of FIGS. 5A to 5E and a second seal assembly.

FIG. 6 illustrates a longitudinal cross-sectional view of a seal arrangement comprising a first seal assembly as illustrated in FIGS. 5A to 5E and a second seal assembly.

The first seal assembly 500 is described in detail above with reference to FIGS. 5A to 5E. The first seal assembly is a rotating seal assembly. The first seal assembly also includes an urging means 584 (in the present example, the urging means 584 is a spring). The urging means 584 is disposed in contact with the back axial face 518 of the first seal face 510 to thereby urge the first seal face towards the second seal assembly 600.

The second seal assembly is similar to the first seal assembly (as described above). The second seal assembly is rotating seal assembly. A brief description of the features of the second seal assembly 600 is given below.

The second seal assembly 600 comprises: second retainer 620; a second seal face 610; and, a cushioning member 630.

The second retainer 620 has an annular shape. The second seal face 610 has an annular shape. The second cushioning member 630 has an annular shape.

The second seal face 610 has: an outer radial surface 612; an inner radial surface 614; a front axial face 616; and a back axial face 618.

The second retainer 620 is configured to receive the second seal face 610 i.e. the second seal face 610 is sized to fit within an inner radial surface of the second retainer 620 so that the outer radial surface 612 of the second seal face. The second cushioning member 630 is disposable around the outer radial surface 612 of the second seal face 610.

In use, the seal assembly 500 illustrated in FIG. 5A is disposed in contact with the second seal assembly to thereby provide a seal therebetween. The first seal face 510 is urged into contact with the second seal face 610 by the urging means 584. That is, the front axial face 516 of the seal face 510 of the first seal assembly (i.e. the first seal face 510) contacts the back axial face 618 of the seal face 610 to provide a seal. In the present example, both the first seal assembly 500 and the second seal assembly 600 are rotating seal assemblies (i.e. they are configured to rotate in use).

In examples, the second seal assembly may be a stationary seal assembly and in such examples, the cushioning member 630 may be dispensed with.

In examples, the second seal assembly may comprise a different driving mechanism or no driving mechanism. The second seal assembly need only provide an axial surface against which the first seal assembly (an aspect of the present disclosure) may provide a seal therewith.

Figure 7:
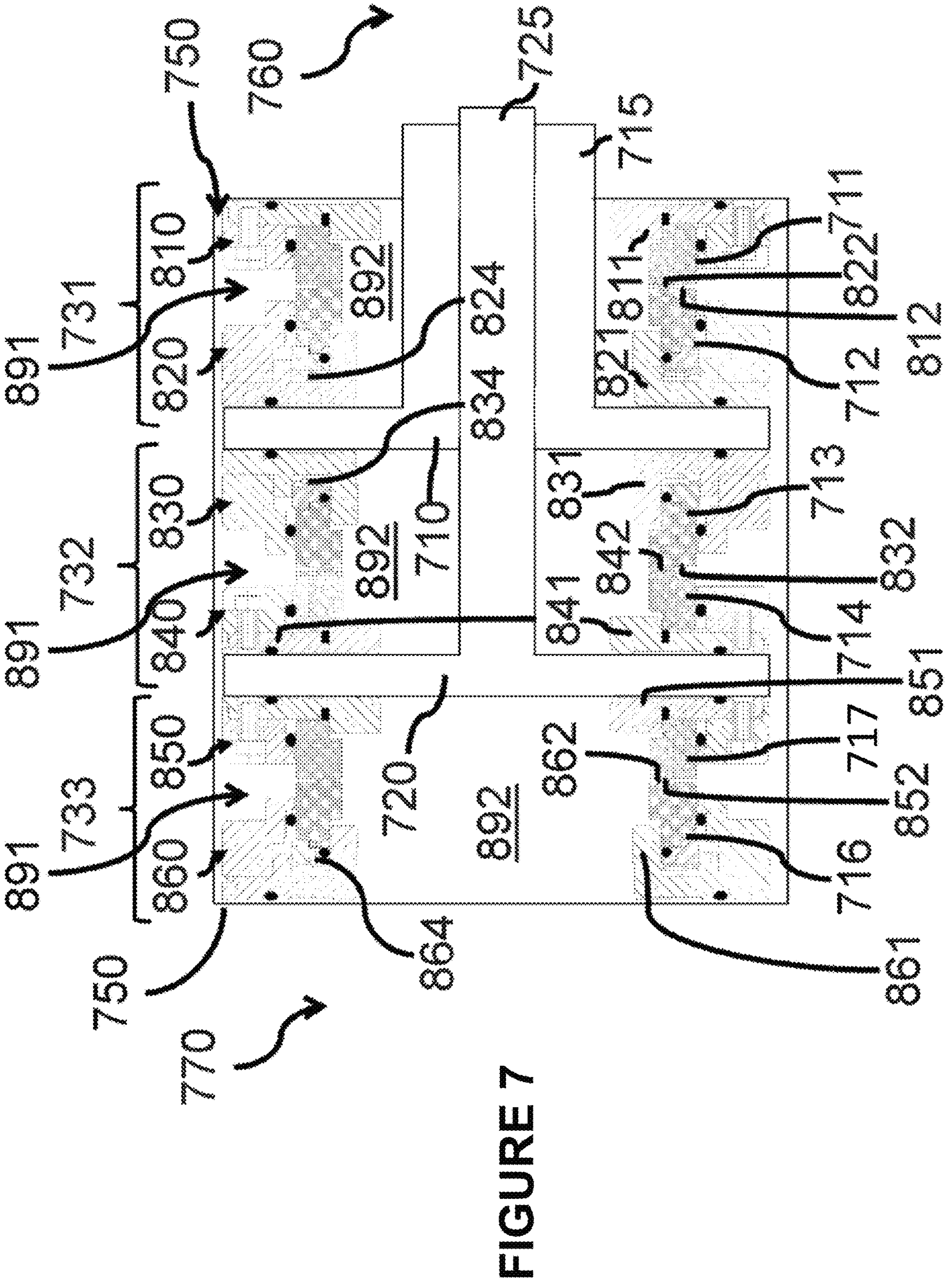
FIG. 7 illustrates a longitudinal cross-sectional view of a test unit comprising a plurality of the seal arrangements shown in FIG. 6.

FIG. 7 illustrates a longitudinal cross-sectional view of a test unit comprising a plurality of the seal arrangements.

The test unit 700 comprises: a stationary housing 750; a first rotor 710; a second rotor 720; a first seal arrangement 731; a second seal arrangement 732; a third seal arrangement 733. The test unit 700 has a proximal end 760 and a distal end 770.

The first rotor 710 comprises a first rotor shaft 715. Rotation of the first rotor shaft 715 results in a corresponding rotation of the first rotor 710. The second rotor 720 comprises a second rotor shaft 725. Rotation of the second rotor shaft 725 results in a corresponding rotation of the first rotor 720.

The test unit shares a central longitudinal axis Y with the first rotor 710, the second rotor 720, the first seal arrangement 731, the second seal arrangement 732 and the third seal arrangement 733.

The first stationary outer housing 751 is connected to the centre stationary housing 752. The centre stationary housing 752 is connected to the second stationary housing 753. The connected combination of the first stationary outer housing 751, the centre stationary housing 752 and the second stationary housing 753 define an inner cavity 750. The first rotor 710, second rotor 720, the first seal arrangement 731, the second seal arrangement 732, the third seal arrangement 733 are disposed in the inner cavity 750.

The second rotor shaft 725 is disposed axially through the first rotor shaft 715. The first rotor shaft 715 and the second rotor shaft 725 extend to a gearbox (not shown). A gearbox (not shown) is configured to rotate the first rotor 710 and the second rotor 720 i.e. by rotation of the respective rotor shafts. The gearbox is disposed on the proximal end 760 of the test unit i.e. the gearbox is closer to the first stationary outer housing 751 than the second stationary outer housing 753.

The gearbox may couple rotation of the first rotor shaft 715 and rotation of the second rotor shaft 725 e.g. rotation of the first rotor shaft 715 at a first variable speed results in a rotation of the second rotor shaft 725 at a second rotor speed. When the first rotor 710 is rotated at a first variable speed and the second rotor 720 is rotated at a second variable speed, wherein the first variable speed and the second variable speed are not equal, the first rotor 710 and the second rotor 720 reciprocate as they rotate.

The first seal arrangement 731, the second seal arrangement 732, are disposed radially around at least part of the first rotor 710 and the second rotor 720. The third seal arrangement 733 is disposed radially around at least part of the second rotor 720.

The first seal arrangement 731 comprises: a first seal assembly 810; a second seal assembly 820. The second seal arrangement 732 comprises: a third seal assembly 830; a fourth seal assembly 840. The third seal arrangement 733 comprises: a fifth seal assembly 850; a sixth seal assembly 860. The first to sixth seal assemblies 810 to 860 are disposed around the central longitudinal axis Y e.g. in other words, central longitudinal axes X of each of the seal assemblies is arranged parallel and coincident with the central longitudinal axis Y of the test unit 700.

The first seal assembly 810 is fixed to the first outer housing 751. The second seal assembly 820 is fixed to a proximal axial side of the first rotor 710. The third seal assembly 830 is fixed to a distal axial side of the first rotor 710. The fourth seal assembly 840 is fixed to a proximal side of the second rotor 720. The fifth seal assembly 850 is fixed to a distal axial side of the second rotor 720. The sixth seal assembly 860 is fixed to the second outer housing 753.

The first seal assembly 810 is configured to remain rotationally stationary in use (e.g. when the first rotor 710 and second rotor 720 are rotated). The second seal assembly 820 is configured to rotate with the first rotor 710 at the first variable angular speed of the first rotor 710. The third seal assembly 830 is configured to rotate with the first rotor 710 at the first variable angular speed of the first rotor 710. The fourth seal assembly 840 is configured to rotate with the second rotor 720 at the second variable angular speed of the second rotor 720. The fifth seal assembly 850 is configured to rotate with the second rotor 720 at the second variable angular speed of the second rotor 720. The sixth seal assembly 860 is configured to remain rotationally stationary in use (e.g. when the first rotor 710 and second rotor 720 are rotated).

The first seal assembly 810 comprises a first retainer 811 and a first sealing ring 711 (a mating ring) having a first seal face 812. The second seal assembly 820 comprises a second retainer 821, a second sealing ring 712 (a primary ring) having a second seal face 822, and a second cushioning member 823. The third seal assembly 830 comprises a third retainer 831, a third sealing ring 713 (a primary ring) having a third seal face 832, and a third cushioning member 833. The fourth seal assembly 840 comprises a fourth retainer 841, a fourth sealing ring 714 (a mating ring) having a fourth seal face 842, and a fourth cushioning member 843. The fifth seal assembly 850 comprises a fifth retainer 851, a fifth sealing ring 717 (a mating ring) having a fifth seal face 852, and a third cushioning member 853. The sixth seal assembly 860 comprises a sixth retainer 861 and, a sixth ring 716 (a primary ring) having a sixth seal face 862.

The first seal assembly 810 opposes the second seal assembly 820. An axial face of the first seal ring 812 abuts an opposing axial face of the second seal ring 822. The first seal arrangement 731 comprises a first urging means 824 configured to axially urge the second seal face 822 toward the first seal face 812 e.g. the first urging means may be a spring for forcing the second seal face 812 along the central longitudinal axis Y of the test unit 700.

The third seal assembly 830 opposes the fourth seal assembly 840. An axial face of the third seal ring 832 abuts an opposing axial face of the fourth seal ring 842. The second seal arrangement 732 comprises a second urging means 834 configured to axially urge the third seal face 832 toward the fourth seal face 842 e.g. the second urging means may be a spring for forcing the third seal face 832 along the central longitudinal axis Y of the test unit 700.

The fifth seal assembly 850 opposes the sixth seal assembly 860. An axial face of the fifth seal ring 852 abuts an opposing axial face of the sixth seal ring 862. The third seal arrangement 733 comprises a third urging means 864 configured to axially urge the sixth seal face 862 toward the fifth seal face 852 e.g. the third urging means may be a spring for forcing the sixth seal face 862 along the central longitudinal axis Y of the test unit 700.

The first seal assembly 831, the second seal assembly 832 and the third seal assembly 833 are each configured to provide a seal in the manner described above with regards to FIG. 6. The seal assemblies 831, 832 & 833 are configured to provide a seal between a first pressure region 891 and a second pressure region 892. The opposing seal rings in each of the seal assemblies seals the first pressure region 891 from the second pressure region 892. The first pressure region 891 is disposed radially around the second pressure region 892.

In use the seal assemblies 831, 832 & 833, are configured to maintain a fluid pressure in the first pressure region 891 which is greater than the fluid pressure in the second pressure region 892.

Whilst a test unit 700 is illustrated in FIG. 7, it will appreciated that the seal assemblies can be applied to a concentric reciprocating pump. An example reciprocating pump is described in WO 2014/112885 A2. For example, one or more seal assemblies may be provided between the rotors of the concentric reciprocating pump and the gearbox which drives the rotor shafts which in turn rotate the rotors of the concentric reciprocating pump. Providing the seal at between these two parts of the reciprocating pump may prevent or reduce egress of process fluid from the rotors of the concentric reciprocating pump and the gearbox. a first seal assembly could be attached to a first rotor shaft of the concentric reciprocating pump and a second seal assembly could be attached to a second rotor shaft of the concentric reciprocating pump to thereby provide a seal between the two seal assemblies and the two shafts.

Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Herein the term clearance refers to a gap between two components. Herein the term backlash refers to lost motion because of the clearance between two components. Put another way, the backlash refers to the additional distance a first component moving relative to a second component needs to travel to engage the second component in comparison to if the two components were machined so that there was no clearance therebetween.

The seal arrangements of the present disclosure described herein may be configured to seal crude oil. The seal arrangements of the present disclosure described have been shown to seal ISO VG-32 oil with conditions of: between 5° C. and 50° C.; between a minimum sealing pressure of 10 bar and maximum sealing pressure of 150 bar; a minimum rotation speed of the rotors (and seal assemblies attached thereto) of 250 revolutions per minute and maximum rotation speed of the rotors (and seal assemblies attached thereto) of 850 revolutions per minute; and, a minimum relative speed between the two rotors of 0 revolutions per minute and a maximum relative speed between the two rotors of 600 revolutions per minute.

The invention claimed is:

1. A seal arrangement for an apparatus comprising:
- a housing; and,
- a rotatable component disposed within the housing;
- wherein the rotatable component is configured to rotate at a variable angular speed about a rotational axis,
- the seal arrangement comprising:
- a first seal assembly configured to be disposed on the rotatable component of the apparatus and to rotate around the rotational axis, the first seal assembly comprising:
  - a first retainer;
  - a first seal face;
  - wherein:
    - the first seal face is disposed within the first retainer;
    - the first retainer is configured to provide a rotary driving force to the first seal face to thereby rotationally drive the first seal face;
    - the first seal face comprises a radially outward facing circumferential surface comprising first seal face surface features; and,
    - the first retainer comprises a radially inward facing circumferential surface comprising first retainer surface features;
    - the first seal face surface features correspond to the first retainer surface features to thereby permit torque to be transferred from the first retainer to the first seal face;

the first seal face surface features comprise:

a plurality of flat portions; and, a plurality of curved portions;

the first retainer surface features comprise:

a plurality of flat portions; and, a plurality of curved portions; and each of the flat portions on the first retainer correspond to a respective flat portion on the first seal face, and each of the curved portions on the first retainer correspond to a respective curved portion on the first seal face;

a first cushioning member disposed between the first seal face and the first retainer, wherein the first cushioning member is configured to dampen the rotary driving force provided by the first retainer to the first seal face;

wherein the cushioning member is compressed by the first seal assembly so that the compression of the cushioning member on the flat portions is a function of the position along the flat portion;

a second seal assembly configured to be disposed on the housing:

a second retainer;

a second seal face;

wherein:

the second seal face configured to be disposed within the second retainer;

wherein the first seal face is disposed in contact with the second seal face to thereby seal against egress of fluid between the first seal face and the second seal face.

2. The seal arrangement of claim 1, wherein the first seal face is configured to provide a selected amount of compression of the first cushioning member.

3. The seal arrangement of claim 1, wherein the first retainer is configured to provide a selected amount of compression of the first cushioning member.

4. The seal arrangement of claim 1, wherein the first seal face comprises a radial groove configured to receive the first cushioning member.

5. The seal arrangement of claim 1, wherein:

the first cushioning member is a unitary element, for example, wherein the unitary element is an O-ring.

6. The seal arrangement of claim 1, wherein:

the first cushioning member comprises any of: nitrile; chloroprene; ethylene; propylene;

fluorocarbon; perfluoroelastomer; and, polytetrafluoroethylene.

7. The seal arrangement of claim 1, wherein:

at least one of:

the first seal face; and, the second seal face;

is movable in an axial direction.

8. The seal arrangement of claim 1, wherein the apparatus comprises a CR downhole pump and the rotatable component comprises a rotor of the CR downhole pump: wherein the CR downhole pump comprises:

a first shaft connected to a first rotor and a second shaft connected to a second rotor, and a housing, wherein the first shaft extends through a wall of the housing and the first rotor is disposed within the housing, and the second shaft extends through a wall of the housing and the second rotor is disposed within the housing.

9. Use of the seal arrangement of claim 1 with a concentric reciprocating, CR, pump.

10. A method of installing a seal to a concentric reciprocating pump, the method comprising:

providing the seal arrangement according to claim 1; and, installing the first seal assembly to an first rotor of the concentric reciprocating pump;

installing the second seal assembly to a second rotor of the concentric reciprocating pump.

* * * * *